United States Patent
Kasamatsu et al.

(10) Patent No.: US 8,444,717 B2
(45) Date of Patent: May 21, 2013

(54) METHOD FOR EVALUATING BATTERY SAFETY UNDER INTERNAL SHORT-CIRCUIT CONDITION, BATTERY AND BATTERY PACK WHOSE SAFETY IS IDENTIFIED BY INTERNAL SHORT-CIRCUIT SAFETY EVALUATION METHOD, AND METHOD FOR PRODUCING THE SAME

(75) Inventors: Shinji Kasamatsu, Osaka (JP); Mikinari Shimada, Osaka (JP); Masayuki Nagamine, Fukushima (JP); Yasuo Fukase, Fukushima (JP); Masatoshi Takahashi, Osaka (JP); Masato Iwanaga, Osaka (JP)

(73) Assignees: Panasonic Corporation, Osaka (JP); Sony Corporation, Tokyo (JP); Sanyo Electric Co., Ltd., Osaka (JP)

( * ) Notice: Subject to any disclaimer, the term of this patent is extended or adjusted under 35 U.S.C. 154(b) by 670 days.

(21) Appl. No.: 12/597,329

(22) PCT Filed: Apr. 22, 2008

(86) PCT No.: PCT/JP2008/001053
§ 371 (c)(1),
(2), (4) Date: Mar. 18, 2010

(87) PCT Pub. No.: WO2008/132837
PCT Pub. Date: Nov. 6, 2008

(65) Prior Publication Data
US 2010/0209767 A1   Aug. 19, 2010

(30) Foreign Application Priority Data
Apr. 24, 2007   (JP) .................................. 2007-114631

(51) Int. Cl.
*H01M 10/48*   (2006.01)
*G01N 27/403*   (2006.01)
*G01R 21/02*   (2006.01)

(52) U.S. Cl.
USPC ........................... 29/623.1; 324/426; 324/500

(58) Field of Classification Search
None
See application file for complete search history.

(56) References Cited

U.S. PATENT DOCUMENTS

| | | | |
|---|---|---|---|
| 6,054,233 A | 4/2000 | Vourlis | |
| 8,163,409 B2 * | 4/2012 | Fujikawa et al. | 429/61 |
| 8,168,314 B2 * | 5/2012 | Fujikawa et al. | 429/61 |
| 2001/0019270 A1 | 9/2001 | Onishi et al. | |
| 2005/0253591 A1 | 11/2005 | Kasamatsu et al. | |
| 2008/0187826 A1 * | 8/2008 | Kasamatsu et al. | 429/149 |

FOREIGN PATENT DOCUMENTS

| | | |
|---|---|---|
| JP | 10-106530 | 4/1998 |
| JP | 11-102729 | 4/1999 |
| JP | 2002-515637 | 5/2002 |
| JP | 2002-352864 | 12/2002 |
| JP | 2004-247064 | 9/2004 |
| JP | 2004-281292 | 10/2004 |
| JP | 2005-158643 | 6/2005 |
| JP | 2005-302634 | 10/2005 |
| JP | 2007-012496 | 1/2007 |
| WO | WO 2008/072456 A1 | 6/2008 |

OTHER PUBLICATIONS

Supplementary European Search Report issued in European Patent Application No. 08738623.1 dated May 25, 2012.

* cited by examiner

*Primary Examiner* — Jonathan Crepeau
(74) *Attorney, Agent, or Firm* — McDermott Will & Emery LLP

(57) ABSTRACT

The invention provides a method for evaluating the safety of a battery under an internal short-circuit condition. The battery includes: an electrode group including a positive electrode, a negative electrode, and an insulating layer for electrically insulating the electrodes, which are wound or laminated; an electrolyte; a housing for housing the electrode group and the electrolyte; and a current-collecting terminal for electrically connecting the electrode group and the housing. The method of the invention includes: placing a foreign object at a location inside the electrode group of the battery where the positive electrode and the negative electrode face each other; and pressing the location by the pressure applied by a pressing tool to locally crush the insulating layer between the positive and negative electrodes, thereby causing an internal short-circuit. The contact area of the electrode group and the pressing tool during the pressing is larger than the area of a rectangle circumscribed about the foreign object. A short-circuit test is conducted at a given location inside the battery to comprehensively evaluate the safety of the battery under an internal short-circuit condition.

6 Claims, 5 Drawing Sheets

(a)

(b)

(a)

(b)

(a)

(b)

METHOD FOR EVALUATING BATTERY SAFETY UNDER INTERNAL SHORT-CIRCUIT CONDITION, BATTERY AND BATTERY PACK WHOSE SAFETY IS IDENTIFIED BY INTERNAL SHORT-CIRCUIT SAFETY EVALUATION METHOD, AND METHOD FOR PRODUCING THE SAME

RELATED APPLICATIONS

This application is the U.S. National Phase under 35 U.S.C. §371 of International Application No. PCT/JP2008/001053, filed on Apr. 22, 2008, which in turn claims the benefit of Japanese Application No. 2007-114631, filed on Apr. 24, 2007, the disclosures of which Applications are incorporated by reference herein.

TECHNICAL FIELD

The invention relates to battery evaluation methods, and particularly, to a method for evaluating safety under an internal short-circuit condition and a battery and a battery pack whose safety is identified.

BACKGROUND ART

Lithium secondary batteries, which are lightweight and have high energy density, are mainly commercialized as the power source for portable devices. Also, lithium secondary batteries are currently receiving attention as large-sized, high-output power sources (e.g., power sources for automobiles). They are being actively developed.

Lithium secondary batteries have an insulating layer between the positive electrode and the negative electrode. The insulating layer has the function of electrically insulating the electrodes from each other while retaining an electrolyte. Since the insulating layer easily shrinks, the positive electrode and the negative electrode tend to come into physical contact with each other to cause an internal short-circuit when the lithium secondary battery is left in a very high temperature environment for an extended period of time. Recently, the capacity of lithium secondary batteries is increasingly becoming higher, and thus, the insulating layer is increasing becoming thinner. Due particularly to this trend, an internal short-circuit is becoming an increasingly important problem to be solved. Once an internal short-circuit occurs, the short-circuit further expands due to Joule's heat generated by the short-circuit current. In some cases, the battery may overheat.

When an internal short-circuit occurs in a battery, it is very important to assure safety. Hence, techniques to enhance battery safety under an internal short-circuit condition have been actively developed. For example, Patent Document 1 proposes a technique in which insulating tape is affixed to the exposed part of a positive or negative electrode current collector to prevent an internal short-circuit between the current collectors. Also, Patent Document 2 proposes a technique in which an ion-conductive insulating layer composed of ceramic particles and a binder is printed on an electrode plate.

Further, to assure safety under an internal short-circuit condition, it is also very important to accurately evaluate the safety of a battery under an internal short-circuit condition. Battery evaluation tests for evaluating exothermic behavior under an internal short-circuit condition as a measure of the safety of batteries such as lithium secondary batteries are defined, for example, by UL standards for lithium batteries (UL1642) and guideline of Battery Association of Japan (SBA G1101-1997 Guideline for Safety Evaluation on Lithium Secondary Cells)(See Patent Document 3).

Examples of such evaluation tests include a nail penetration test and a crush test. A nail penetration test is performed by sticking a nail into a side face of a battery to cause a short-circuit between the positive electrode, the negative electrode, and the nail inside the battery, and observing changes in battery temperature, battery voltage, etc. caused by Joule's heat generated by the short-circuit current flowing through the short-circuit. Also, a crush test is performed by physically deforming a battery by using a round bar, square bar, flat plate, etc. to cause an internal short-circuit between the positive electrode and the negative electrode, and observing changes in battery temperature, battery voltage, etc.

Patent Document 1: Japanese Laid-Open Patent Publication No. 2004-247064
Patent Document 2: Japanese Laid-Open Patent Publication No. Hei 10-106530
Patent Document 3: Japanese Laid-Open Patent Publication No. Hei 11-102729

DISCLOSURE OF INVENTION

Problem to be Solved by the Invention

In considering the uses of a battery, it is necessary to identify which level of safety performance the battery has in the event of an internal short-circuit, such as "generates no heat" or "generates a little heat". However, since conventional methods fail to accurately evaluate safety under an internal short-circuit condition, the level of safety is not identified. There is thus a need for identifying the safety level of each battery with respect to an internal short-circuit.

First, with respect to internal short-circuit safety, the diligent research of the inventors has revealed that the safety of a battery in the event of an internal short-circuit changes greatly depending on the location of the short-circuit inside the battery (e.g., the distance from battery surface, whether it is a current collector exposed part or an active-material formed part, the battery shape). For example, the safety in the event of a short-circuit near the surface of a battery is apparently high, compared with that in the event of a short-circuit at an inner part of the battery, because of the influence of heat radiation. Also, when short-circuits occur simultaneously at a location where low-resistant members such as electrode current collectors face each other and a location where high-resistant members such as electrode active material face each other, most of the short-circuit current due to the short-circuits flows through the location where the low-resistant current collectors face each other. As a result, most of the Joule's heat is generated at the current collector opposing location, not the active material opposing location with poor thermal stability, and therefore, the safety under the internal short-circuit condition is apparently high.

That is, according to conventional evaluation methods, even a battery which can be more dangerous depending on where a short-circuit occurs may be improperly evaluated as safe. Therefore, in order to accurately evaluate the safety of a battery under an internal short-circuit condition, it is very important to cause an internal short-circuit at a desired location that is not in an area leading to improper evaluation of being apparently safe, in view of the battery shape and battery components.

However, in the case of nail penetration tests, the locations of short-circuits are limited to outermost parts of a battery, and the evaluation results are greatly affected by the constitution of the outermost part. For example, the amount of heat W (W) generated in a short-circuit area is expressed as follows:

$$W = V^2 \times R1/(R1+R2)^2$$

where V represents the battery voltage (V), R1 represents the resistance (Ω) of the short-circuit area, and R2 represents the internal resistance (Ω) of the battery.

Thus, when the resistance of the short-circuit area is equivalent to the internal resistance of the battery, the amount of heat generated in the short-circuit area becomes maximum, whereas when the resistance of the short-circuit area decreases, the amount of heat generation decreases. That is, in a nail penetration test, when the outermost part where a short-circuit occurs is provided with a low resistant part, such as a current collector exposed part on which there is no active material, the amount of Joule's heat decreases, and the safety under an internal short-circuit condition is apparently high.

However, if a foreign object enters a battery, an internal short-circuit may occur at any location inside the battery, depending on the size, shape, hardness, etc. of the foreign object. That is, conventional nail penetration test methods may not accurately evaluate safety under possible internal short-circuit conditions in the market.

Also, with respect to crush test methods, the analysis of short-circuit behavior in crush tests has revealed that a plurality of locations are short-circuited at one time or there is variation in the locations of short-circuits among tests. Therefore, crush test methods also may not accurately evaluate safety under an internal short-circuit condition.

Accordingly, there is a need for an evaluation method in which a short-circuit test is performed at a given location inside a battery to comprehensively evaluate the safety of the battery under an internal short-circuit condition, an evaluation apparatus, and identification of battery safety level.

Means for Solving the Problem

The invention has been accomplished in view of the problems as discussed above, and relates to a method for accurately evaluating safety under an internal short-circuit condition.

That is, the invention provides a method for evaluating the safety of a battery under an internal short-circuit condition. The battery includes: an electrode group including a positive electrode, a negative electrode, and an insulating layer for electrically insulating the positive and negative electrodes from each other, the positive and negative electrodes and the insulating layer being wound or laminated; an electrolyte; a housing for housing the electrode group and the electrolyte; and a current-collecting terminal for electrically connecting the electrode group and the housing. The method includes: placing a foreign object at a location inside the electrode group of the battery where the positive electrode and the negative electrode face each other; and pressing the location where the foreign object is placed by the pressure applied by a pressing tool, to locally crush the insulating layer interposed between the positive and negative electrodes, thereby causing an internal short-circuit. The contact area of the electrode group and the pressing tool during the pressing is larger than the area of a rectangle that is circumscribed about the foreign object.

The part of the pressing tool to come into contact with the electrode group is preferably U-shaped or in the shape of a flat plate.

The part of the pressing tool to come into contact with the electrode group preferably comprises a material with a heat conductivity of 15 W/m·K or less.

The part of the pressing tool to come into contact with the electrode group preferably comprises a rubber material.

Preferably, the foreign object is produced by cutting a metal wire having a rectangular sectional shape, and the foreign object is placed so that a non-cut part of the foreign object faces the electrode (the positive electrode and/or the negative electrode) or the insulating layer.

The face of the foreign object to face the insulating layer is preferably bent or curved.

In another embodiment, the foreign object is preferably shaped like a flat plate at least a part of the surface of which has a protrusion extending outwardly from the surface.

The invention also provides a method for producing a battery whose safety is identified by the internal short-circuit safety evaluation method of the invention.

The invention also provides a method for producing a battery pack whose safety is identified by the internal short-circuit safety evaluation method of the invention.

The invention also provides a battery produced by the battery production method of the invention.

The invention also provides a battery pack produced by the battery pack production method of the invention.

Effect of the Invention

The method for evaluating the safety of a battery under an internal short-circuit condition according to the invention permits accurate evaluation of battery safety under an internal short-circuit condition. Therefore, the battery can be used in applications suited for the safety level of the battery, and thus the safety of the battery during use is further enhanced.

Also, by producing batteries according to the production method of a battery whose safety level is identified by the battery internal short-circuit safety evaluation method of the invention, the same safety level of the produced batteries under an internal short-circuit condition can be assured.

BEST MODE FOR CARRYING OUT THE INVENTION

Figure 1:
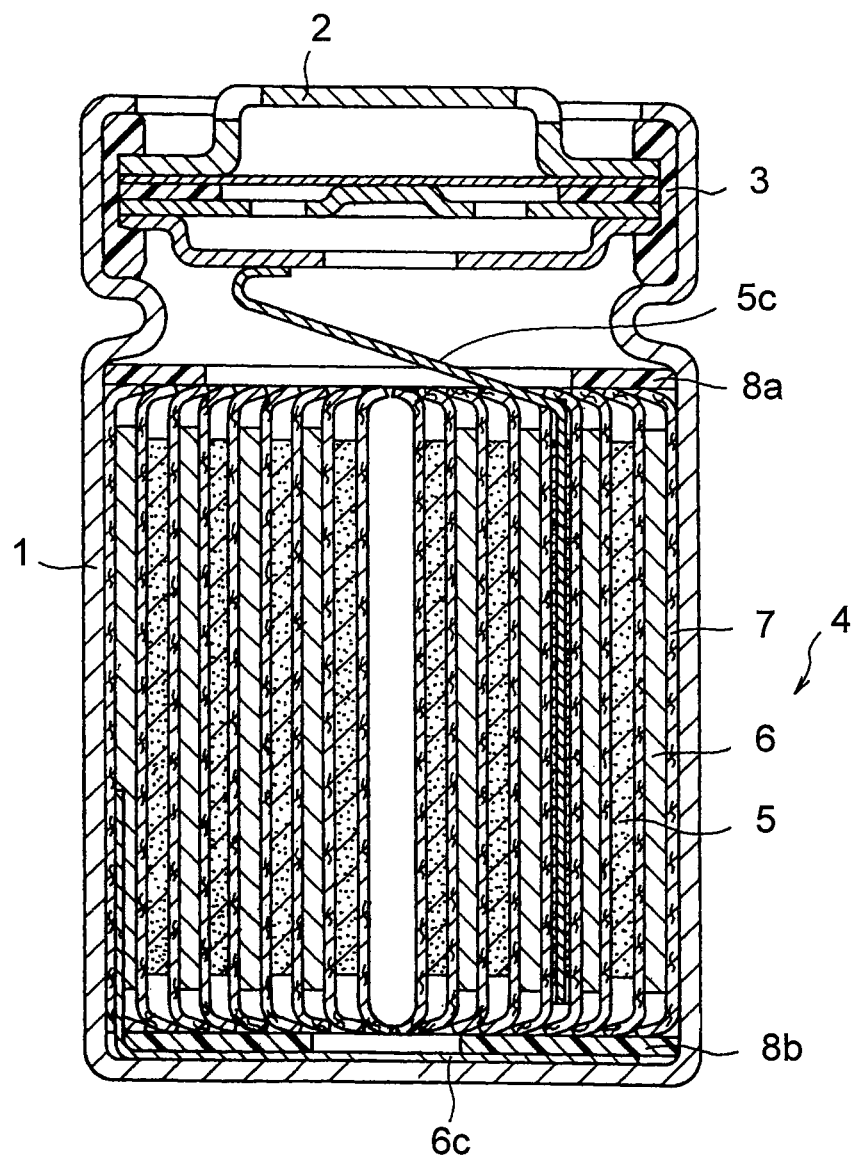
FIG. 1 is a longitudinal sectional view schematically showing the configuration of a battery produced in an example of the invention.

The invention uses a method for evaluating the safety of a battery under an internal short-circuit condition. The method includes: placing a foreign object at a location inside the electrode group of the battery where the positive electrode and the negative electrode face each other; and pressing the location where the foreign object is placed by the pressure applied by a pressing tool, to locally crush the insulating layer interposed between the positive and negative electrodes, thereby causing an internal short-circuit. The contact area of the electrode group and the pressing tool during the pressing is larger than the area of a rectangle that is circumscribed about the foreign object.

The use of the battery internal short-circuit safety evaluation method of the invention allows the short-circuit current to be concentrated on a given location, thereby permitting accurate evaluation of safety under an internal short-circuit condition.

Also, the contact area of the electrode group and the pressing tool during the pressing is made larger than the area of the rectangle that is circumscribed about the foreign object. This allows not only the foreign object itself but also the vicinity of the foreign object between the positive electrode plate, the insulating layer, and the negative electrode plate to be pressed as well. This facilitates even diffusion of heat produced by an internal short-circuit into the vicinity of the foreign object, compared to pressing the foreign object only. It is thus possible to perform an internal short-circuit test in a condition close to the actual battery condition in which an even pressure is applied to the interior of the electrode group in the event of an internal short-circuit, and to provide a highly stable evaluation method.

Methods for placing a foreign object in a battery include a method of disassembling a completed battery, taking out the electrode group from the housing, placing a foreign object at a location inside the electrode group where the positive electrode and the negative electrode face each other, reassembling, and pressing with a pressing tool. Specifically, the foreign object is placed, for example, at a location where the positive electrode and the negative electrode face each other between the positive electrode and the insulating layer or between the negative electrode and the insulating layer. In this way, placing a foreign object after the production of a battery is preferable because it is possible to avoid the occurrence of an internal short-circuit during the production process of the battery.

Also, it is more preferable to place a foreign object by placing the foreign object and an insulating sheet in layer, and then to assemble again, pull out the insulating sheet, and press to cause a short-circuit. This permits prevention of a short-circuit during reassembling after placing the foreign object. The material for the insulating sheet preferably has a heat resistance and an insulating property.

With respect to the conditions of the device for pressing, any device may be used if it can perform the above-described test. Examples include pressing devices of screw type using a servomotor, post guide screw type, pendulum type, lever type, crank type, mechanical press type, hydraulic press type, and air press type, and they can be used for pressing at a predetermined speed or under predetermined pressing conditions.

In pressing, the contact area of the electrode group and the pressing tool is made larger than the area of the rectangle that is circumscribed about the foreign object. As used herein, the area of the rectangle that is circumscribed about the foreign object refers to the smallest rectangle that completely surrounds the foreign object. When the location where the foreign object is placed is pressed, the insulating layer is crushed due to compression and deformation between the foreign object and the insulating layer, thereby causing an internal short-circuit. At this time, since the insulating film constituting the insulating layer is drawn, the actual area where compression and deformation occur is thought to be close to the area of the rectangle that is circumscribed about the foreign object.

In order to apply an even pressure by pressing without concentrating the pressure on the foreign object to enable highly stable (or reproducible) evaluation, the contact area of the electrode group and the pressing tool needs to be larger than the area of the rectangle that is circumscribed about the foreign object.

The size of the pressing tool can be determined as appropriate, depending on the size of the battery, the size of the foreign object, etc. Also, by making the part of the pressing tool to come into contact with the electrode group U-shaped or shaped like a flat plate, the contact area of the pressing tool and the electrode group during pressing can be enlarged.

A U-shaped pressing tool is a pressing tool whose part to face the electrode group (contact part) is convex and U-shaped and whose sectional shape is semicircular or oval. A flat-plate shaped pressing tool is a pressing tool whose part to face the electrode group is planar, and the planar shape can be rectangular, square, circular, oval, and the like.

Also, the part of the pressing tool to come into contact with the electrode group preferably includes a material with a heat conductivity of 15 W/m·K or less, and more preferably is made of a material with a heat conductivity of 15 W/m·K or less. Since the location where the foreign object is placed is pressed with the pressing tool, part of the heat generated by an internal short-circuit is dissipated through the contact part with the pressing tool that is present immediately thereabove. A material with a lower heat conductivity than metal materials characterized by high heat dissipation (e.g., iron, carbon steel, and stainless with a heat conductivity of 50 to 16 W/m·K) is used for the contact part. The use of such a low heat conductivity material suppresses the conduction of heat generated in the location where the foreign object is placed into the pressing tool through the contact part. As a result, the generated heat is concentrated on the short-circuited area and variation can be reduced.

Examples of materials with a heat conductivity of 15 W/m·K or less include rubber materials such as nitrile rubber, styrene butadiene rubber, natural rubber, ethylene propylene rubber, chloroprene rubber, silicon rubber, urethane rubber, fluorocarbon rubber, and Hypalon, resin materials such as polyethylene, polypropylene, polyvinyl chloride, polyvinylidene chloride, polystyrene, polyvinyl acetate, Teflon®, phenolic resin, epoxy resin, melamine resin, urea resin, unsaturated polyester resin, alkyd resin, polyurethane, and polyimide, and ceramic materials such as alumina, silicon nitride, and zirconia. These material can be used singly, or if necessary, in combination of two or more of them.

Also, the part of the pressing tool to come into contact with the electrode group preferably includes a rubber material, and more preferably is made of a rubber material. The contact part using a rubber material has rubber elasticity. Thus, during pressing, the rubber material undergoes elastic deformation at the part of the pressing tool in contact with the location of the electrode group at which the foreign object is placed, so that the rubber material can closely fit to the surface shape of the electrode group. Hence, even if the shape of the pressing tool is similar to that of a pressing tool made of another material, a larger contact area can be obtained, which is preferable. Also, rubber materials have very low heat conductivities of 0.2 to 2 W/m·K, which makes it possible to further suppress the heat dissipation at the short-circuit area.

Also, it is preferable to produce the foreign object by cutting a metal wire having a rectangular sectional shape and place the foreign object so that a non-cut part of the foreign object faces the electrode or the insulating layer. That is, it is preferable to place a foreign object, produced by cutting a metal wire having a rectangular shape in a section perpendicular to the longitudinal direction thereof, so that the cut section does not face the electrode (positive electrode or negative electrode) or insulating layer.

When foreign pieces produced by cutting a metal wire by machining are used as the foreign object, foreign objects can be mass-produced stably. Further, by causing a non-cut part to face the electrode or insulating layer, it is possible to prevent burrs on the cut section of the foreign object from coming into contact with the electrode or insulating layer. This permits prevention of damage of the electrode or destruction of the insulating layer by the burrs on the cut section during pressing.

Methods for forming a metal wire having a rectangular sectional shape include: slitting in which a metal plate of predetermined thickness is slit; and rolling in which a metal wire is processed to form a rectangular section by using reduction rolls of predetermined width.

Further, methods for cutting a metal wire having a rectangular sectional shape include machining, laser machining, cutting by metal fatigue, and thermal cutting by heating wire. Machining methods such as cutting with scissors or a cutter are particularly preferable since the size of burrs produced by cutting can be reduced.

Also, the face of the foreign object to face the insulating layer is preferably bent or curved. In the case of foreign objects having such shapes, the area of the circumscribed rectangle tends to become large, and thus the insulating layer can be crushed stably. Further, when such a foreign object is placed on an electrode, the face of the foreign object facing the electrode is supported at a plurality of locations, thereby making it possible to prevent the foreign object from turning over or falling off, and place the foreign object stably with an easy operation and with good reproducibility.

Figure 3:
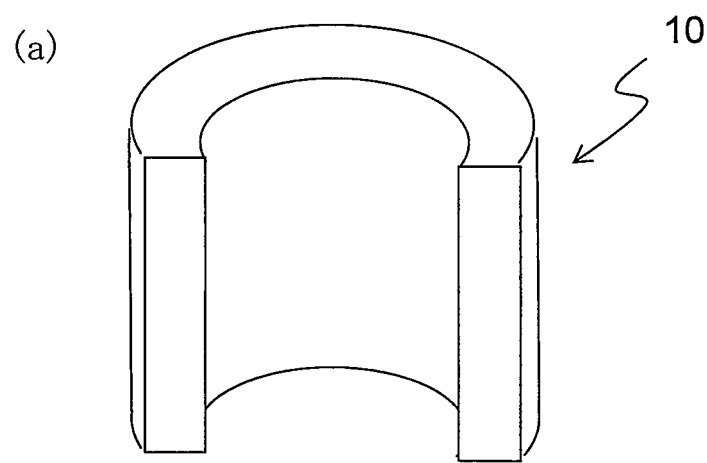
FIG. 3 has perspective views of exemplary foreign objects.
Figure 3:
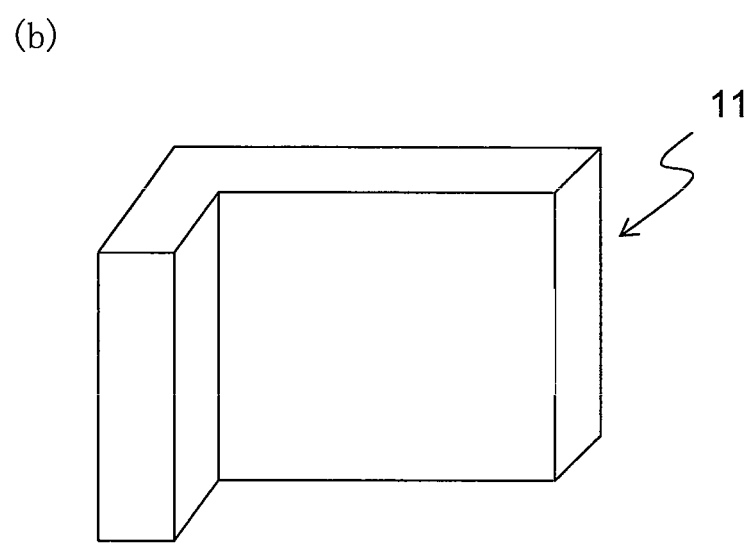
Figure 4:
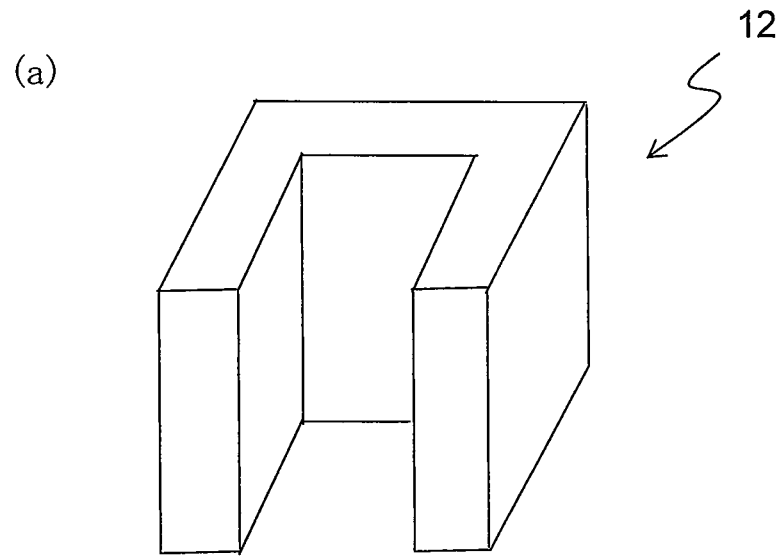
FIG. 4 has perspective views of exemplary foreign objects.
Figure 4:
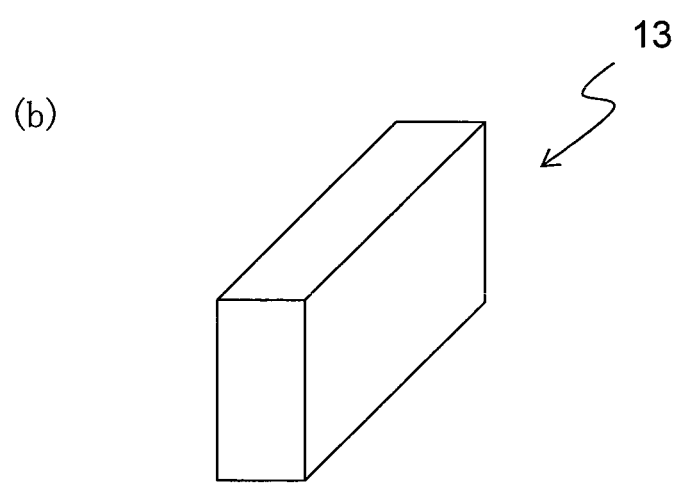

As used herein, "bent" or "curved" specifically refers to a shape such as L shape, V shape, U shape, C shape, S shape, Z shape, W shape, I shape, or inverted U shape. Such a shape is a shape of the foreign object seen from the insulating layer side when the foreign object is placed so as to face the insulating layer. FIG. 3 and FIG. 4 illustrate exemplary foreign objects. FIG. 3 and FIG. 4 are perspective views schematically showing the shapes of foreign objects. FIG. 3(a) illustrates a foreign object 10, whose face to face the insulating layer is C-shaped. FIG. 3(b) illustrates a foreign object 11, whose face to face the insulating layer is L-shaped. FIG. 4(a) illustrates a foreign object 12, whose face to face the insulating layer has an inverted U shape. FIG. 4(b) illustrates a foreign object 13, whose face to face the insulating layer is I-shaped.

Also, the use of a foreign object having such a shape as a flat plate partially having a protrusion is preferable, since not only the foreign object but also the vicinity of the foreign object can be pressed. Such a shape specifically refers to a shape such as a flat-plate like object at least a part of the surface of which has a protrusion extending outwardly from the surface. Examples of such shapes include a thumbtack shape and a T shape.

The T shape refers to the shape of a rectangular plate-like object one surface of which has a plate-like protrusion extending from one side of the rectangle or the vicinity thereof to the opposing side or the vicinity thereof. In this shape, the sectional shape in the direction perpendicular to the direction in which the plate-like protrusion extends is T-shaped. By pressing the protrusion against the insulating layer, it is possible to crush the insulating layer to cause an internal short-circuit while causing the flat plate portion to press the vicinity of the foreign object.

Figure 5:
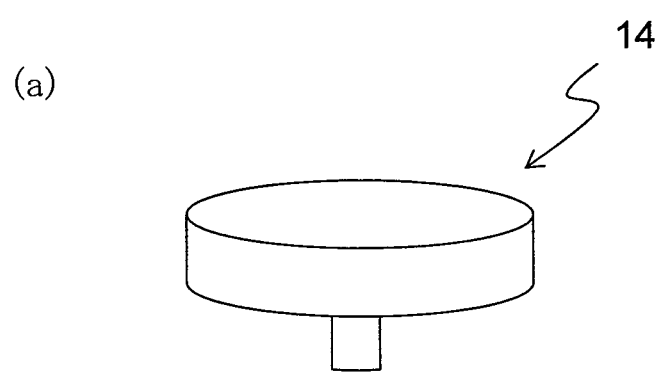
FIG. 5 has perspective views of exemplary foreign objects.
Figure 5:
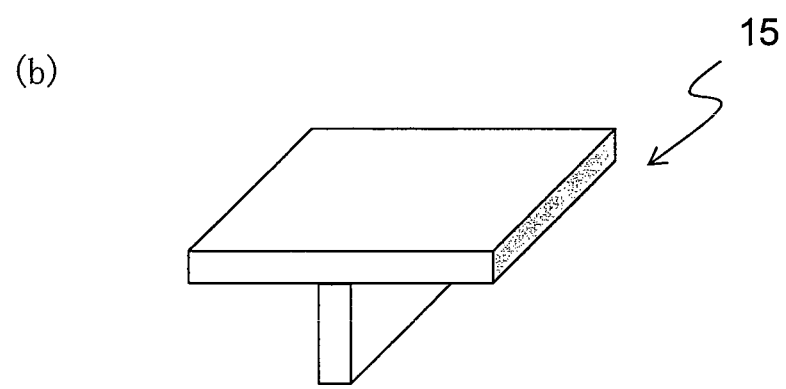

Also, the thumbtack shape refers to the shape of a round plate-like object whose surface has a protrusion at an almost central portion thereof. FIG. 5 illustrates exemplary foreign objects with a protrusion. FIG. 5 shows schematic perspective views of the shapes of foreign objects with a protrusion. FIG. 5(a) illustrates a foreign object 14, which has a thumbtack shape. FIG. 5(b) illustrates a foreign object 15, whose sectional shape in the direction perpendicular to the direction in which the plate-like protrusion extends is T-shaped.

A foreign object of thumbtack shape or T shape can be produced, for example, by: a method of cutting a flat-plate like metal bar by machining; a method of crimping, bonding, or welding a metal bar to a flat plate, the metal bar having a diameter equal to that of a protrusion; and a method of cutting away a flat surface to form a protrusion.

Also, it is preferable to produce batteries according to the production method of a battery whose safety level with respect to an internal short-circuit is identified by these internal short-circuit evaluation methods. By producing batteries by the same production method, the same internal short-circuit safety level can be assured.

Further, it is preferable to produce battery packs according to the production method of a battery pack whose safety level with respect to an internal short-circuit is identified by these internal short-circuit evaluation methods. By producing battery packs by the same production method, the same internal short-circuit safety level can be assured.

Also, batteries produced by these production methods are preferable, because the same battery internal short-circuit safety level can be assured.

Further, battery packs produced by these production methods are preferable, because the same battery pack internal short-circuit safety level can be assured.

The above-described battery evaluation devices of the invention are applicable, for example, to primary batteries such as manganese dry batteries, alkaline dry batteries, and lithium primary batteries, and secondary batteries such as lead-acid batteries, nickel cadmium storage batteries, nickel metal-hydride batteries, and lithium secondary batteries, without being limited to specific battery types.

EXAMPLES

The invention is hereinafter described specifically by way of Examples and Comparative Examples.

Example 1

Battery Preparation

A cylindrical lithium secondary battery was produced in the following manner as a battery to be subjected to a safety evaluation under an internal short-circuit condition.
(i) Preparation of Positive Electrode A positive electrode mixture paste was prepared by stirring 3 kg of cobalt lithium oxide powder (median diameter 15 µm) serving as a positive electrode active material, 1 kg of N-methyl-2-pyrrolidone (NMP) solution (available from Kureha Corporation) containing 12% by weight of polyvinylidene fluoride (PVDF) serving as a binder, 90 g of acetylene black serving as a conductive agent, and a suitable amount of NMP serving as a dispersion medium with a double-arm kneader. The positive electrode mixture paste was applied onto both sides of a strip-like positive electrode current collector made of a 20-µm-thick aluminum foil, dried, and rolled with reduction rolls to form positive electrode active material layers, so that the thickness of the active-material formed part was 180 µm. The resultant electrode was cut to 56 mm to obtain a positive electrode. The part of the current collector corresponding to the innermost part of the electrode group was provided with an exposed part, to which an aluminum connection terminal was welded. The current collector was also provided with an exposed part about one turn from the end of the positive electrode mixture on the outermost part of the positive electrode of the battery.

(ii) Preparation of Negative Electrode

A negative electrode mixture paste was prepared by stirring 3 kg of artificial graphite powder (median diameter 20 μm) serving as a negative electrode active material, 75 g of an aqueous dispersion (available from Zeon Corporation) containing 40% by weight of modified styrene butadiene rubber particles serving as a binder, 30 g of carboxymethyl cellulose (CMC) serving as a thickener, and a suitable amount of water serving as a dispersion medium with a double-arm kneader. The negative electrode mixture paste was applied onto both sides of a strip-like negative electrode current collector made of a 20-μm-thick copper foil, dried, and rolled with reduction rolls to form negative electrode active material layers, so that the thickness of the active-material formed part was 180 μm. The resultant electrode plate was cut to a 57.5 mm to obtain a negative electrode. The part of the current collector corresponding to the outermost part of the electrode group was provided with an exposed part having a length of about one turn, and a nickel connection terminal was welded to the end thereof.

(iii) Battery Fabrication

The positive electrode and the negative electrode were wound together with a 20 μm thick insulating layer composed of three layers of polypropylene-polyethylene-polypropylene (available from Celgard K. K.) interposed therebetween, to form an electrode group. The electrode group was inserted into a nickel-plated iron cylindrical housing (diameter 18 mm, height 65 mm, internal diameter 17.85 mm), and 5.0 g of an electrolyte was injected into the housing. The opening of the housing was sealed with a cover, to complete a lithium secondary battery with a capacity of 2400 mAh.

The electrolyte used was prepared by dissolving $LiPF_6$ at a concentration of 1 mol/L in a solvent mixture of ethylene carbonate (EC), dimethyl carbonate (DMC), and ethyl methyl carbonate (EMC). The volume ratio of EC/DMC/EMC in the solvent mixture was 1:1:1. To the electrolyte was added 3% by weight of vinylene carbonate (VC).

First, the battery was preliminarily charged and discharged twice and then charged to 4.1 V at a current value of 400 mA. Subsequently, it was stored in an environment at 45° C. for 7 days.

Batteries were produced in the above procedure and charged in the following conditions. These batteries were evaluated for safety under an internal short-circuit condition.

Constant current charge: Current value 1575 mA/End-of-charge voltage 4.25 V

Constant voltage charge: Charge voltage 4.25 V/End of charge current 100 mA

FIG. 1 is a longitudinal sectional view of a battery produced in this example. The battery of FIG. 1 includes an iron battery case 1 and an electrode group 4 housed in the battery case 1. The electrode group 4 is composed of a positive electrode 5, a negative electrode 6, and a separator 7. The positive electrode 5 and the negative electrode 6 are spirally wound, with a separator 7 interposed therebetween. Mounted on and under the electrode group 4 are an upper insulator plate 8a and a lower insulator plate 8b, respectively. The open edge of the battery case 1 is sealed by crimping a seal plate 2 with a gasket 3 interposed therebetween.

Also, one end of an aluminum positive electrode lead 5c is attached to the positive electrode 5, while the other end of the positive electrode lead 5c is connected to the seal plate 2 serving as the positive electrode terminal. One end of a nickel negative electrode lead 6c is attached to the negative electrode 6, while the other end of the negative electrode lead 6c is connected to the battery case 1 serving as the negative electrode terminal.

(Internal Short-Circuit Safety Evaluation)

Figure 2:
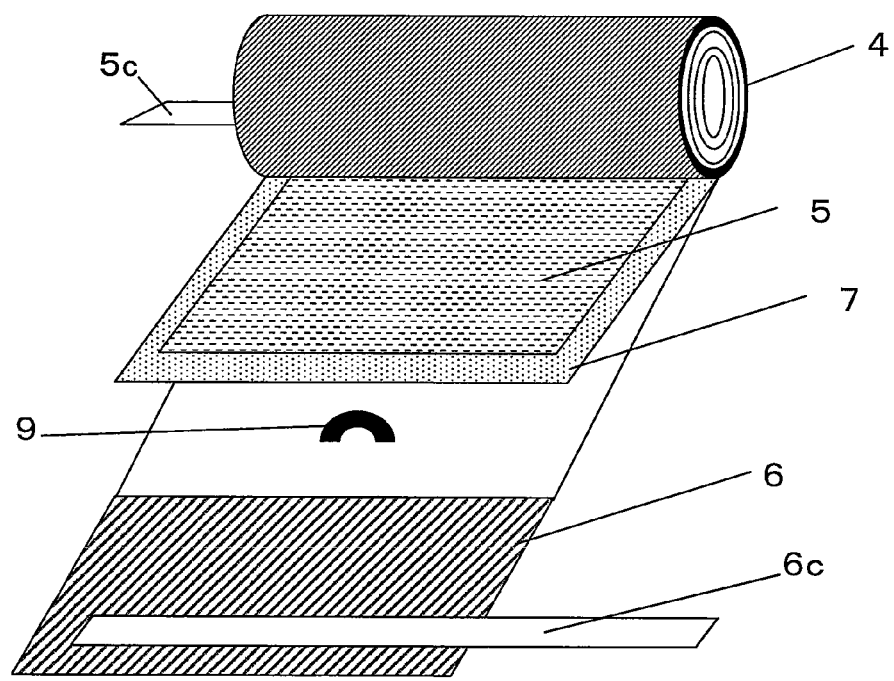
FIG. 2 is a perspective view showing a method for evaluating a battery internal short-circuit of the invention.

FIG. 2 is a perspective view showing an embodiment of a method for evaluating the safety of a battery under an internal short-circuit condition according to the invention. FIG. 2 illustrates the electrode group 4 and the foreign object 9 placed in the electrode group 4. The electrode group 4 of FIG. 2 has been taken out of the battery produced and charged in the above manner by disassembling the battery in a dry environment with a dew point of −25° C. or less, and the outermost part of the electrode group 4 is unwound so that the positive and negative electrode active materials can be seen.

Subsequently, the outermost part of the positive electrode current collector (hereinafter "Al foil") at the end of winding was cut at the border between the active-material coated portion and the Al foil. A foreign object 7 was placed at a location where the positive electrode active material layer and the negative electrode active material layer faced each other between the positive electrode active material layer of the positive electrode 5 and the insulating layer 7. Specifically, as illustrated in FIG. 2, the foreign object 9 was placed 20 mm inward from the end of the positive electrode active-material coated portion between the positive electrode active material layer and the separator (insulating layer 7). The foreign object 9 was produced by cutting a Ni metal wire with a rectangular section of 200 μm×50 μm to a length of 2 mm with scissors, and shaping it so that the face to face the insulating layer 7 was C-shaped (whole length 2 mm, outer diameter 0.9 mm). The area of the rectangle circumscribed about the foreign object 9 was 0.8 $mm^2$, and the length (height) of the foreign object 9 in the direction perpendicular to the electrode surface was 200 μm.

In order to prevent a short-circuit before a test, a polyimide tape with a thickness of 50 μm and a width of 15 mm was placed at a location facing the foreign object 9 between the insulating layer 7 and the negative electrode 6, and the electrode group 4 was rewound. A mark was put on the surface of the location of the electrode group 4 where the foreign object 9 was placed, so that the location of the foreign object 9 could be identified.

An internal short-circuit test was performed, using a thermostatic oven for preheating and a thermostatic oven for testing, and the testing thermostatic oven was equipped with a pressure application device therein.

A sealed pack containing the electrode group 4 was placed in the preheating thermostatic oven which was set to a temperature 5° C. higher than a test temperature, and left for 30 to 60 minutes until a predetermined temperature was reached. Thereafter, the sealed electrode group 4 was placed in the thermostatic oven set to 60° C., and left until the battery temperature reached 60° C. The electrode group 4 was taken out of the sealed pack, and placed in the testing thermostatic oven set to 60° C. Therein, the electrode group 4 was fitted with a voltage measuring terminal and a thermocouple terminal. The electrode group 4 was then placed on the stand of the pressure application device so that the mark of the electrode group 4 would come into contact with the pressing tool.

Thereafter, the polyimide tape for preventing a short-circuit was pulled out, and the thermostatic oven was closed. When the temperature of the electrode group 4 reached 60° C., the location of the foreign object was pressed by the pressure applied by a pressing tool to locally crush the insulating layer 7 between the positive and negative electrodes, thereby causing an internal short-circuit. The pressing condition was set to a constant speed of 0.1 mm/s, and the pressing was stopped at the instant when the voltage lowered by 0.07 V from the open circuit voltage.

The pressing tool used was a flat-plate like square bar made of carbon steel (heat conductivity 58 W/mK) and having a width of 10 mm×10 mm. The contact area of the pressing tool and the electrode group 4 was measured by affixing pressure sensitive paper (FUJI PRESCALE, extreme low pressure type, available from FUJI FILM Corporation) to the part of another uncharged electrode group to come into contact with the pressing tool, and applying a pressure of 50 N thereto. Since the color of the pressure sensitive paper changes due to pressure application, the area where the color changed was measured to determine the contact area. In this example, the contact area of the pressing tool was 14 mm² (1.4 mm×10 mm).

The result of the internal short-circuit test was evaluated as follows. Ten batteries were tested to check whether or not they produced such heat that the surface temperature of the electrode group after the occurrence of an internal short-circuit reached 170° C. or more. When it was found that five or more of them produced such abnormal heat, it was judged that the short-circuit current could be concentrated on the area where the internal short-circuit occurred and that the safety level could be sufficiently evaluated.

Example 2

A battery was produced in the same manner as in Example 1 and an internal short-circuit test was performed in the same manner, except for the use of a U-shaped round bar with a diameter of 10 mm as the pressing tool. The contact area of the pressing tool was 6 mm² (3 mm×2 mm).

Example 3

A battery was produced in the same manner as in Example 1 and an internal short-circuit test was performed in the same manner, except for the use of a round flat plate with a diameter of 5 mm as the pressing tool. The contact area of the pressing tool was 25 mm² (4.5 mm×5.5 mm).

Example 4

A battery was produced in the same manner as in Example 1 and an internal short-circuit test was performed in the same manner, except for the use of a flat-plate like square bar having a width of 10 mm×10 mm and made of stainless steel 304 (heat conductivity 16 W/mK) as the pressing tool. The contact area of the pressing tool was 25 mm² (4.5 mm×5.5 mm).

Example 5

A battery was produced in the same manner as in Example 1 and an internal short-circuit test was performed in the same manner except that the surface of the pressing tool was provided with alumina (SA610 available from Sodick Co., Ltd., heat conductivity 14 W/m·K). The contact area of the pressing tool was 25 mm² (4.5 mm×5.5 mm).

Example 6

A battery was produced in the same manner as in Example 1 and an internal short-circuit test was performed in the same manner except that nitrile rubber (IN-80 available from IRUMAGAWA RUBBER CO., LTD., thickness 2 mm, heat conductivity 0.3 W/m·K) was affixed to the surface of the pressing tool. The contact area of the pressing tool was 40 mm² (4 mm×10 mm).

Example 7

A battery was produced in the same manner as in Example 5 and an internal short-circuit test was performed in the same manner, except for the use of a foreign object whose face to face the insulating layer had an L shape with a right-angled bend, one side thereof being 1 mm. The area of the rectangle circumscribed about the foreign object was 1.0 mm² (1.0×1.0 mm).

Comparative Example 1

A battery produced in the same manner as in Example 1 was evaluated as follows. The battery was charged to 4.25 V, placed in a thermostatic oven set to 60° C. without being disassembled, and kept until the battery temperature reached 60° C. An iron nail (ø3 mm) was used as the pressing tool and stuck into the electrode group. The pressing condition was set to a constant speed of 0.1 mm/s. After the battery voltage reached 4.15 V or less due to a short circuit, the nail was further moved 200 and then stopped. The above results are shown in Table 1.

TABLE 1

| | Examples | | | | | | | Comp. Example |
|---|---|---|---|---|---|---|---|---|
| | 1 | 2 | 3 | 4 | 5 | 6 | 7 | 1 |
| Pressing tool | Flat plate | U shape | Flat plate | Flat plate | Flat plate | Flat plate | Flat plate | ø3 nail |
| Shape of pressing tool | 10 mm square bar | 10 mm round bar | ø5 round plate | 10 mm square bar | 10 mm square bar | 10 mm square bar | 10 mm square bar | Nail |
| Form of contact part | Carbon steel | Carbon steel | Carbon steel | Stainless*1 | Alumina | Carbon steel + Nitrile rubber | | Iron |
| Heat conductivity W/m·k | 58 | 58 | 58 | 16 | 14 | 0.3 | 0.3 | 83 |
| Shape of foreign object | C shape | C shape | C shape | C shape | C shape | C shape | L shape | — |
| Circumscribed rectangle mm² | 0.8 | 0.8 | 0.8 | 0.8 | 0.8 | 0.8 | 1.0 | — |

TABLE 1-continued

|  | Examples | | | | | | | Comp. Example |
|---|---|---|---|---|---|---|---|---|
|  | 1 | 2 | 3 | 4 | 5 | 6 | 7 | 1 |
| Area of contact part mm² | 14 | 6 | 25 | 25 | 25 | 40 | 40 | — |
| Height of foreign object μm | 200 | 200 | 200 | 200 | 200 | 200 | 200 | — |
| Width of foreign object μm | 50 | 50 | 50 | 50 | 50 | 50 | 50 | — |
| Length of foreign object mm | 2 | 2 | 2 | 2 | 2 | 2 | 2 | — |
| Method for cutting foreign object | Mechanically cutting the side face of foreign object | | | | | | | |
| Number of cells with heat generation | 7/10 | 6/10 | 7/10 | 7/10 | 8/10 | 9/10 | 9/10 | 0/10 |

*¹Stainless steel 304

In Comparative Example 1, abnormal heat generation of 170° C. or more was not observed in the nail penetration test. The reason for this is probably as follows. The positive electrode current collector is present at the outermost part of the positive electrode. Thus, a short-circuit occurred between the stuck nail, the positive electrode plate, and the negative electrode plate, and the short-circuit current concentrated on the outermost, low-resistant area, which made the evaluation result safe.

Contrary to this, with respect to Examples 1 to 7, in which the location at which the foreign object was placed was pressed to locally crush the insulating layer between the positive and negative electrodes so as to cause an internal short-circuit, abnormal heat generation was observed. It has been found that in Examples 1 to 7, the safety level can be evaluated by the internal short-circuit tests. Further, it has been found that as in the results of Examples 1 to 7, as the contact area of the electrode group and the pressing tool during pressing increases relative to the area of the rectangle circumscribed about the foreign object, the number of battery cells with abnormal heat generation further increases, and the safety test becomes stable.

It has been found that as in Example 5, when the alumina material with a heat conductivity of 14 W/mK is used, the number of battery cells with abnormal heat generation further increases, and the safety test becomes stable.

It has also been found that as in Examples 6 and 7, since the rubber material, which has rubber elasticity, can increase the contact area of the electrode group and the pressing tool during pressing, the number of battery cells with abnormal heat generation further increases, and the safety test becomes stable.

Example 8

An internal short-circuit test was performed in the same manner as in Example 1, except that a Ni metal wire with a rectangular section of 2 mm×50 μm was cut to a length of 200 μm with scissors to prepare a foreign object, that the foreign object was shaped so that the face to face the insulating layer was C-shaped (whole length 2 mm, outer diameter 0.9 mm), and that the foreign object was placed at a position 20 mm inward from the end of the positive electrode mixture coated portion between the positive electrode active material and the separator. The area of the rectangle circumscribed about the foreign object was 0.8 mm². The result is shown in Table 2.

TABLE 2

|  | Example 1 | Example 8 |
|---|---|---|
| Pressing tool | Flat plate | U shape |
| Shape of pressing tool | 10 mm square bar | 10 mm square bar |
| Form of contact part | Carbon steel | Carbon steel |
| Heat conductivity W/m · k | 58 | 58 |
| Shape of foreign object | C shape | C shape |
| Circumscribed rectangle mm² | 0.8 | 0.8 |
| Area of contact part mm² | 14 | 14 |
| Height of foreign object μm | 200 | 200 |
| Width of foreign object μm | 50 | 50 |
| Length of foreign object mm | 2 | 2 |
| Method for cutting foreign object | Mechanically cutting the side face of foreign object | Mechanically cutting the insulating layer side of foreign object |
| Number of cells with heat generation | 7/10 | 5/10 |

Table 2 shows that when a foreign object is produced by cutting a metal wire with a rectangular sectional shape and a non-cut portion faces the electrode or the insulating layer, the number of battery cells with abnormal heat generation further increases, and the safety test becomes stable.

This is probably due to the following reason. Since the non-cut portion faces the electrode or the insulating layer, the occurrence of a local short circuit by the burrs produced by cutting is suppressed, and the whole foreign object could be pressed. Hence, the safety test could be performed more stably.

Example 9

An internal short-circuit test was performed in the same manner as in Example 1, except for the use of a foreign object whose face to face the insulating layer had an L shape with a right-angled bend, one side thereof being 1 mm. The area of the rectangle circumscribed about the foreign object was 1.0 mm².

Example 10

An internal short-circuit test was performed in the same manner as in Example 1, except for the use of a foreign object whose face to face the insulating layer had an inverted U shape with two right-angled bends, one side thereof being 0.67 mm. The area of the rectangle circumscribed about the foreign object was 0.4 mm².

Example 11

An internal short-circuit test was performed in the same manner as in Example 1, except for the use of a foreign object whose face to face the insulating layer had a linear I shape with a length of 2 mm. The area of the rectangle circumscribed about the foreign object was 0.1 mm².

Example 12

A foreign object of thumbtack shape was produced by resistance welding a nickel bar (protrusion) with a diameter of 0.5 mm and a length of 200 μm to the center of a round nickel plate with a thickness of 100 μm and a diameter of 2 mm. This foreign object was placed at a location where the positive electrode active material layer faced the negative electrode active material layer between the negative electrode active material and the insulating layer so that the protrusion faced the insulating layer. Except for this, in the same manner as in Example 1, an internal short-circuit test was performed. The area of the circumscribed rectangle was calculated from the size of the round nickel plate of the foreign object, and was found to be 3.1 mm².

Example 13

A foreign object was produced by cutting a 200-μm thick square nickel plate, 1 mm each side, by a cutting method using an end mill, so as to form a protrusion with a width of 100 μm, a length of 1 mm, and a height of 150 μm at the center of the square plate. The foreign object produced had a T shape and was composed of a square plate (flat plate portion) with a size of 1 mm×1 mm and a thickness of 50 μm partially having a protrusion with a width of 100 μm, a length of 1 mm, and a height of 150 μm. This foreign object was placed at a location where the positive electrode active material layer and the negative electrode active material layer faced each other between the negative electrode active material and the insulating layer such that the protrusion faced the insulating layer. Except for this, in the same manner as in Example 1, an internal short-circuit test was performed. The area of the circumscribed rectangle was calculated from the size of the square nickel plate of this foreign object, and was found to be 1.0 mm². These results are shown in Table 3.

TABLE 3

|  | Examples | | | | | |
| --- | --- | --- | --- | --- | --- | --- |
|  | 1 | 9 | 10 | 11 | 12 | 13 |
| Pressing tool | Flat plate | Flat plate | Flat plate | Flat plate | Flat plate | Flat plate |
| Shape of pressing tool | 10 mm square bar | 10 mm square bar | 10 mm square bar | 10 mm square bar | 10 mm square bar | 10 mm square bar |
| Form of contact part | Carbon steel | Carbon steel | Carbon steel | Carbon steel | Carbon steel | Carbon steel |
| Heat conductivity W/m · k | 58 | 58 | 58 | 58 | 58 | 58 |
| Shape of foreign object | C shape | L shape | inverted U shape | I shape | Thumbtack shape | T shape |
| Circumscribed rectangle mm² | 0.8 | 1.0 | 0.4 | 0.1 | 3.1 | 1.0 |
| Area of contact part mm² | 14 | 14 | 14 | 14 | 14 | 14 |
| Height of foreign object Mm | 200 | 200 | 200 | 200 | 200 | 200 |
| Width of foreign object Mm | 50 | 50 | 50 | 50 | 50 | 50 |
| Length of foreign object Mm | 2 | 2 | 2 | 2 | 2 | 2 |
| Method for cutting foreign object |  | Mechanically cutting the side face of foreign object | | | | Cutting |
| Number of cells with heat generation | 7/10 | 6/10 | 7/10 | 5/10 | 7/10 | 8/10 |

When the shape of the foreign object is C shape of Example 1, L shape of Example 9, or inverted U shape of Example 10, which is a bent or curved shaped, the area of the rectangle circumscribed about the foreign object can be enlarged, and the whole foreign object, not partially, can be pressed. It is thus possible to crush the insulating layer stably. Also, when the I-shaped foreign object is placed so as to define the height direction perpendicular to the electrode, it tends to turn over, and the operation of such placement was difficult. Contrary to this, in the case of Example 1, Example 9, and Example 10, the foreign object could be easily placed at a predetermined position.

Also, it has been found that as in Example 12 and Example 13, when thumbtack-shaped and T-shaped foreign objects are used, the number of battery cells with abnormal heat generation increases and that stable safety tests can be performed. This is probably because by pressing the protrusion against the insulating layer, it was possible to crush the insulating layer to cause an internal short-circuit while allowing the flat plate to press the vicinity of the foreign object.

As described above, according to the test methods of the invention, the safety levels of batteries under an internal short-circuit condition could be clearly identified.

Thus, in order to give suitable uses of batteries and design application devices, the safety levels of batteries or battery packs were specified by placing the following indications on the batteries, battery packs, catalogues specifying battery characteristics, etc. For example, Example 1 is expressed as "Internal short circuit 60° C.-7/10", and Example 2 is expressed as "Internal short circuit 60° C.-6/10".

The specification of safety levels is not limited to the above-described indication methods and various forms are possible. For example, in addition to numbers representing the test conditions or results, it is possible to employ symbols and characters according to predetermined standards.

INDUSTRIAL APPLICABILITY

The use of the battery internal short-circuit evaluation methods, the battery, and the battery pack according to the invention permits accurate evaluation of safety under an internal short-circuit condition. It is therefore possible to provide highly reliable batteries.

The invention claimed is:

1. A method for evaluating the safety of a battery under an internal short-circuit condition, the battery comprising: an electrode group comprising a positive electrode, a negative electrode, and an insulating layer for electrically insulating the positive electrode and the negative electrode from each other, the positive electrode, the negative electrode and the insulating layer being wound or laminated; an electrolyte; a housing for housing the electrode group and the electrolyte; and a current-collecting terminal for electrically connecting the electrode group and the housing, the method comprising:

placing a foreign object at a location inside the electrode group of the battery where the positive electrode and the negative electrode face each other; and pressing the location where the foreign object is placed by the pressure applied by a pressing tool, to locally crush the insulating layer interposed between the positive electrode and the negative electrode, thereby causing an internal short-circuit, wherein the contact area of the electrode group and the pressing tool during the pressing is larger than the area of a rectangle circumscribing the foreign object, and the part of the pressing tool to come into contact with the electrode group comprises a material with a heat conductivity of 15 W/m·K or less.

2. The method for evaluating the safety of the battery under an internal short-circuit condition in accordance with claim 1, wherein the part of the pressing tool to come into contact with the electrode group is U-shaped or in the shape of a flat plate.

3. The method for evaluating the safety of the battery under an internal short-circuit condition in accordance with claim 1, wherein the material is a rubber material.

4. The method for evaluating the safety of the battery under an internal short-circuit condition in accordance with claim 1, wherein the foreign object is produced by cutting a metal wire having a rectangular sectional shape, and the foreign object is placed so that a non-cut part of the foreign object faces the electrode or the insulating layer.

5. The method for evaluating the safety of the battery under an internal short-circuit condition in accordance with claim 1, wherein the face of the foreign object to face the insulating layer is bent or curved.

6. The method for evaluating the safety of the battery under an internal short-circuit condition in accordance with claim 1, wherein the foreign object is shaped like a flat plate partially having a protrusion.

* * * * *